US012242468B1

United States Patent
Brenner et al.

(10) Patent No.: US 12,242,468 B1
(45) Date of Patent: Mar. 4, 2025

(54) GENERATIVE MACHINE LEARNING WITH RETRIEVER HAVING RECONFIGURABLE SEQUENCE OF RANKERS

(71) Applicant: Goldman Sachs & Co. LLC, New York, NY (US)

(72) Inventors: Eliot P. Brenner, Westfield, NJ (US); Koustuv Dasgupta, Scarsdale, NY (US); Dinesh Gupta, Princeton, NJ (US); Manjunath G. Hegde, Bangalore (IN); Amy Francesca Pajak, London (GB); Goncalo Nuno Ventura de Melo, London (GB); Abdallah Mohamed Abdo Mohamed Bashir, London (GB)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 18/797,294

(22) Filed: Aug. 7, 2024

Related U.S. Application Data

(63) Continuation of application No. 18/659,799, filed on May 9, 2024.

(30) Foreign Application Priority Data

Nov. 17, 2023 (IN) .............................. 202311078197

(51) Int. Cl.
*G06F 16/242* (2019.01)
*G06F 16/2452* (2019.01)
*G06F 16/2457* (2019.01)

(52) U.S. Cl.
CPC ...... *G06F 16/242* (2019.01); *G06F 16/24522* (2019.01); *G06F 16/24578* (2019.01)

(58) Field of Classification Search
CPC ...................................................... G06F 16/242
See application file for complete search history.

(56) References Cited

U.S. PATENT DOCUMENTS

| 2024/0028909 A1* | 1/2024 | Wang | G06N 5/041 |
| 2024/0289561 A1* | 8/2024 | Qadrud-Din | G06F 40/40 |

OTHER PUBLICATIONS

Lewis et al., "Retrieval-Augmented Generation for Knowledge-Intensive NLP Tasks", arXiv:2005.11401v4 [cs.CL], Apr. 2021, 19 pages.
Wikipedia, "Large Language Model", Oct. 2023, 20 pages.
Wikipedia, "Self-Supervised Learning", Oct. 2023, 6 pages.
(Continued)

*Primary Examiner* — Van H Oberly

(57) ABSTRACT

A method includes obtaining an input query at a retriever model, where the retriever model includes a reconfigurable sequence of one or more rankers selected from among a plurality of rankers. Each ranker is configured to identify a specified number of information chunks relevant to the input query. The method also includes providing one or more of the information chunks from the retriever model to a generative model. The method further includes using the generative model to create a response to the input query, where the response is based on the one or more information chunks. The plurality of rankers includes a bi-encoder, a cross-encoder, and a large language model (LLM)-ranker.

20 Claims, 8 Drawing Sheets

(56) References Cited

OTHER PUBLICATIONS

Allenai, "A Repository of Language Instructions for NLP Tasks", GitHub, Feb. 2023, 11 pages.
Bigscience-Workshop, "PromptSource", GitHub, Jul. 2022, 7 pages.
LangChain, "Prompting Strategies", Mar. 2024, 44 pages.
Weng, "Prompt Engineering", Lil'Log, Mar. 2023, 80 pages.
Hwchase17, "LangChainHub", GitHub, Apr. 2023, 10 pages.
Yuan et al., "Self-Rewarding Language Models", arXiv:2401.10020v2 [cs.CL], Feb. 2024, 23 pages.
Khattab et al., "ColBERT: Efficient and Effective Passage Search via Contextualized Late Interaction over BERT", arXiv:2004.12832v2 [cs.IR], Jun. 2020, 10 pages.
Rafailov et al., "Direct Preference Optimization: Your Language Model is Secretly a Reward Model", arXiv:2305.18290v2 [cs.LG], Dec. 2023, 27 pages.
Raudaschl, "RAG-Fusion: The Next Frontier of Search Technology", GitHub, Sep. 2023, 7 pages.
Pradeep et al., "RankVicuna: Zero-Shot Listwise Document Reranking with Open-Source Large Language Models", arXiv:2309.15088v1 [cs.IR], Sep. 2023, 10 pages.
Cormack et al., "Reciprocal Rank Fusion outperforms Condorcet and individual Rank Learning Methods", SIGIR '09: Proceedings of the 32nd international ACM SIGIR Conference, Jul. 2009, 2 pages.
Wikipedia, "Bradley—Terry model", Jun. 2023, 3 pages.
U.S. Securities and Exchange Commission, "Credit Agreement among Dunkin Finance Corp.", Nov. 2010, 34 pages.
Bclavie, "Welcome to RAGatouille", GitHub, Mar. 2024, 17 pages.
Lucidrains, "Self-Rewarding Language Model", GitHub, Apr. 2024, 25 pages.
Ouyang et al., "Training language models to follow instructions with human feedback", arXiv:2203.02155v1 [cs.CL], Mar. 2022, 68 pages.
Myscale, "RQABench: Retrieval QA Benchmark", GitHub, Sep. 2024, 11 pages.
Ma et al., "Query Rewriting for Retrieval-Augmented Large Language Models", arXiv:2305.14283v3 [cs.CL], Oct. 2023, 13 pages.
Yu et al., "Generate rather than Retrieve: Large Language Models are Strong Context Generators", arXiv:2209.10063v3 [cs.CL], Jan. 2023, 27 pages.
Ye et al., "Prompt Engineering a Prompt Engineer", arXiv:2311.05661v2 [cs.CL], Feb. 2024, 31 pages.
Brenner et al., "Retrieval-Augmented Generation (RAG) System Optimization", U.S. Appl. No. 18/659,799, filed May 9, 2024, 54 pages.

\* cited by examiner

GENERATIVE MACHINE LEARNING WITH RETRIEVER HAVING RECONFIGURABLE SEQUENCE OF RANKERS

CROSS-REFERENCE TO RELATED APPLICATION AND PRIORITY CLAIM

This application claims priority under 35 U.S.C. § 120 as a continuation of U.S. patent application Ser. No. 18/659,799 filed on May 9, 2024, which claims priority under 35 U.S.C. § 119 to Indian Provisional Patent Application No. 202311078197 filed on Nov. 17, 2023. Both of these applications are hereby incorporated by reference in their entirety.

TECHNICAL FIELD

This disclosure is generally directed to machine learning systems and processes. More specifically, this disclosure is directed to generative machine learning with a retriever having a reconfigurable sequence of rankers.

BACKGROUND

Large language models (LLMs) represent neural networks or other machine learning models that include many parameters (often billions of parameters) and that are trained on large quantities of unlabeled text using self-supervised learning. Many large language models use a transformer-based machine learning architecture and are pre-trained in a generative manner. Large language models can find use in a number of natural language processing (NLP) tasks or other tasks, such as when large language models are used to process input queries from users and generate natural language responses to the input queries.

SUMMARY

This disclosure relates to generative machine learning with a retriever having a reconfigurable sequence of rankers.

In a first embodiment, a method includes obtaining an input query at a retriever model, where the retriever model includes a reconfigurable sequence of one or more rankers selected from among a plurality of rankers. Each ranker is configured to identify a specified number of information chunks relevant to the input query. The method also includes providing one or more of the information chunks from the retriever model to a generative model. The method further includes using the generative model to create a response to the input query, where the response is based on the one or more information chunks. The plurality of rankers includes a bi-encoder, a cross-encoder, and a large language model (LLM)-ranker.

In a second embodiment, an apparatus includes at least one processing device configured to provide an input query to a retriever model, where the retriever model includes a reconfigurable sequence of one or more rankers selected from among a plurality of rankers. Each ranker is configured to identify a specified number of information chunks relevant to the input query. The at least one processing device is also configured to provide one or more of the information chunks from the retriever model to a generative model. The at least one processing device is further configured to use the generative model to create a response to the input query, where the response is based on the one or more information chunks. The plurality of rankers includes a bi-encoder, a cross-encoder, and an LLM-ranker.

In a third embodiment, a non-transitory computer readable medium contains instructions that when executed cause at least one processor to obtain an input query at a retriever model, where the retriever model includes a reconfigurable sequence of one or more rankers selected from among a plurality of rankers. Each ranker is configured to identify a specified number of information chunks relevant to the input query. The non-transitory computer readable medium also contains instructions that when executed cause the at least one processor to provide one or more of the information chunks from the retriever model to a generative model. The non-transitory computer readable medium further contains instructions that when executed cause the at least one processor to use the generative model to create a response to the input query, where the response is based on the one or more information chunks. The plurality of rankers includes a bi-encoder, a cross-encoder, and an LLM-ranker.

In a fourth embodiment, a method includes obtaining training data for a retrieval-augmented generation (RAG) architecture having a retriever model and a generative model. The retriever model is configured to identify information chunks relevant to input queries, and the generative model is configured to generate outputs based on the information chunks and the input queries. The method also includes generating a prompt for the generative model and generating multiple sets of queries for the retriever model. Each query in the multiple sets of queries is configured to cause the retriever model to select a set of information chunks associated with the prompt. The method further includes generating multiple responses to the prompt using the generative model and the sets of information chunks and determining rewards associated with the RAG architecture based on the responses. In addition, the method includes training the generative model based on the training data and the rewards to produce an updated RAG architecture.

In a fifth embodiment, an apparatus includes at least one processing device configured to obtain training data for a RAG architecture having a retriever model and a generative model. The retriever model is configured to identify information chunks relevant to input queries, and the generative model is configured to generate outputs based on the information chunks and the input queries. The at least one processing device is also configured to generate a prompt for the generative model and generate multiple sets of queries for the retriever model. Each query in the multiple sets of queries is configured to cause the retriever model to select a set of information chunks associated with the prompt. The at least one processing device is further configured to generate multiple responses to the prompt using the generative model and the sets of information chunks and determine rewards associated with the RAG architecture based on the responses. In addition, the at least one processing device is configured to train the generative model based on the training data and the rewards to produce an updated RAG architecture.

In a sixth embodiment, a non-transitory computer readable medium contains instructions that when executed cause at least one processor to obtain training data for a RAG architecture having a retriever model and a generative model. The retriever model is configured to identify information chunks relevant to input queries, and the generative model is configured to generate outputs based on the information chunks and the input queries. The non-transitory computer readable medium also contains instructions that when executed cause the at least one processor to generate a prompt for the generative model and generate multiple sets of queries for the retriever model. Each query in the multiple sets of queries is configured to cause the retriever model to select a set of information chunks associated with the prompt. The non-transitory computer readable medium further contains instructions that when executed cause the at least one processor to generate multiple responses to the prompt using the generative model and the sets of information chunks and determine rewards associated with the RAG architecture based on the responses. In addition, the non-transitory computer readable medium contains instructions that when executed cause the at least one processor to train the generative model based on the training data and the rewards to produce an updated RAG architecture.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
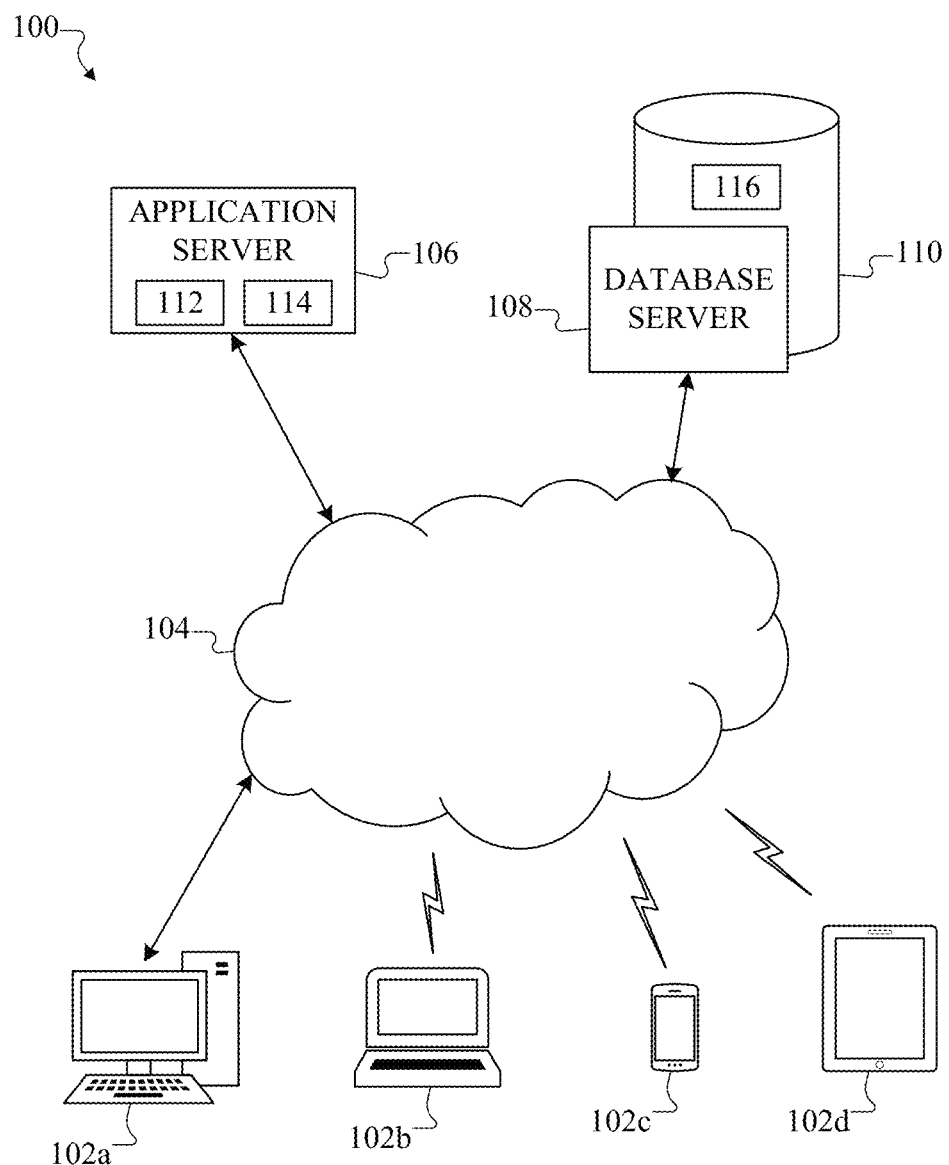
FIG. 1 illustrates an example system supporting generative machine learning according to this disclosure.

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, large language models (LLMs) represent neural networks or other machine learning models that include many parameters (often billions of parameters) and that are trained on large quantities of unlabeled text using self-supervised learning. Many large language models use a transformer-based machine learning architecture and are pre-trained in a generative manner. Large language models can find use in a number of natural language processing (NLP) tasks or other tasks, such as when large language models are used to process input queries from users and generate natural language responses to the input queries.

Unfortunately, applying large language models to real-world mission-critical applications remains challenging. Among other reasons, this can be due to the tendency of large language models to generate hallucinations, which means that the large language models can generate responses that are presented as fact when the responses are actually fabricated by the large language models. This can also be due to the inability of large language models to use external knowledge or properly encode all necessary or desired information.

This disclosure provides techniques supporting generative machine learning with a retriever having a reconfigurable sequence of rankers. As described in more detail below, a framework can include a retriever model and a generative model. In some cases, the generative model may represent a large language model. The retriever model can be used to receive and process user input queries, identify one or more relevant chunks of information associated with each user input query, and provide the user input queries and the relevant chunks as prompts to the generative model. The relevant chunks of information may be identified from documents, websites, or any other suitable source(s) of information (which are generally referred to collectively as "documents"). The generative model can process the relevant chunk(s) associated with each prompt and generate an output (such as a natural language output) for each prompt. The retriever model can implement various techniques described below in order to improve the quality of the information chunks provided to the generative model, such as by supporting a reconfigurable sequence of rankers in which each ranker may identify and output relevant chunks identified by that ranker. In this way, the described techniques may allow more-relevant information chunks to be provided to the generative model, which can increase the quality of the outputs generated by the generative model.

Moreover, it might be possible to optimize individual components of a system that includes a large language model. However, it can be difficult to optimize other components of the system. For example, general large language models are typically trained on the task of next-token prediction using unrestricted general corpora, and their outputs frequently do not align in various ways with what human users want. As a result, several methods have been developed to better align the outputs of a large language model based on human feedback or updates to a policy used by the large language model. Often times, these methods are said to incorporate some type of reward-based feedback to the large language model. However, these approaches generally cannot be applied to a retriever model used with the large language model.

This disclosure also provides techniques for retrieval-augmented generation optimization using a self-rewarding optimization technique. As described in more detail below, training data for a retrieval-augmented generation (RAG) architecture having a retriever model and a generative model can be obtained. The retriever model can identify information chunks relevant to input queries, and the generative model can generate outputs based on the information chunks and the input queries. A prompt for the generative model can be generated, and multiple sets of queries for the retriever model can be generated. Each query in the multiple sets of queries may cause the retriever model to select a set of information chunks associated with the prompt. Multiple responses to the prompt can be generated using the generative model and the sets of information chunks, and rewards associated with the RAG architecture can be generated based on the responses. The generative model can be trained based on the training data and the rewards to produce an updated RAG architecture. In some cases, the training data can be augmented with multiple sets of preference pairs, which can be based on the multiple responses from the generative model. Generation of the prompt, generation of the multiple sets of queries, generation of the multiple responses, determination of the rewards, and training of the generative model can be repeated based on the augmented training data and the updated RAG architecture to produce another updated RAG architecture. In this way, the described techniques can be used to optimize a RAG architecture (including the retriever model of the RAG architecture), which can help to improve the performance of the RAG architecture.

FIG. 1 illustrates an example system 100 supporting generative machine learning according to this disclosure. As shown in FIG. 1, the system 100 includes multiple user devices 102a-102d, at least one network 104, at least one application server 106, and at least one database server 108 associated with at least one database 110. Note, however, that other combinations and arrangements of components may also be used here.

In this example, each user device 102a-102d is coupled to or communicates over the network(s) 104. Communications between each user device 102a-102d and at least one network 104 may occur in any suitable manner, such as via a wired or wireless connection. Each user device 102a-102d represents any suitable device or system used by at least one user to provide information to the application server 106 or database server 108 or to receive information from the application server 106 or database server 108. Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information, such as devices that can transmit user input queries and that can receive and present responses to the user input queries.

The at least one network 104 facilitates communication between various components of the system 100. For example, the network(s) 104 may communicate Internet Protocol (IP) packets, frame relay frames, Asynchronous Transfer Mode (ATM) cells, or other suitable information between network addresses. The network(s) 104 may include one or more local area networks (LANs), metropolitan area networks (MANs), wide area networks (WANs), all or a portion of a global network such as the Internet, or any other communication system or systems at one or more locations. The network(s) 104 may also operate according to any appropriate communication protocol or protocols.

The application server 106 is coupled to the at least one network 104 and is coupled to or otherwise communicates with the database server 108. The application server 106 supports various functions related to generative machine learning. For example, the application server 106 may perform various operations using a framework that includes one or more retriever models 112 and one or more generative models 114. Each retriever model 112 is configured to receive and process user input queries, identify one or more relevant chunks of information associated with each user input query, and provide the user input queries and the relevant chunks as prompts to at least one generative model 114. The relevant chunks of information may be identified from various documents, such as portable document format (PDF) or other electronic documents, websites, or any other suitable source(s) of information. In some cases, for instance, the database 110 may store various documents 116 from which the relevant chunks of information may be extracted. Each generative model 114 is configured to process the relevant chunk(s) associated with each prompt and generate an output (such as a natural language output) for each prompt. In some cases, at least one generative model 114 can represent at least one large language model or other machine learning model.

In some embodiments, each retriever model 112 can implement various techniques described below in order to improve the quality of the information chunks provided to the generative model(s) 114. For example, each retriever model 112 may be implemented using one or more rankers, such as a bi-encoder, a cross-encoder, and/or an LLM-ranker. In some cases, one, two, or three of these rankers may be used in a retriever model 112. Also, in some cases, each retriever model 112 can have a reconfigurable arrangement of one or more rankers. Each of the one, two, or three rankers (or other number of rankers) of the retriever model 112 can be used to identify the "top K" documents or chunks of information for each input query, meaning the retriever model 112 can identify one or more (K) chunks of information that appear most relevant to each input query (meaning K≥1). The framework can also support various operations related to tuning the design or operation of each retriever model 112. For instance, a grid search or other algorithm may be used for simultaneously tuning the component(s) of a retriever model 112, such as by identifying the value of K to be used by each of the bi-encoder, a cross-encoder, and/or an LLM-ranker in the retriever model 112. Different fields of information in the information chunks can also be handled differently by each of the bi-encoder, a cross-encoder, and/or an LLM-ranker in the retriever model 112. In addition, the size(s) of the information chunks provided by a retriever model 112 to a generative model 114 can be controlled. Note that one, some, or all of these features may be used in or with each retriever model 112.

Also, in some embodiments, a retrieval-augmented generation (RAG) system that includes at least one retriever model 112 and at least one generative model 114 can be optimized in a manner that permits self-rewarding optimization. For example, part of the optimization process for the RAG system can involve generating multiple sets of queries for a retriever model 112, where information chunks retrieved by the retriever model 112 in response to the queries can be used by a generative model 114 to generate responses. Rewards can be determined based on the responses, and the RAG system can be trained using training data and augmented training data over time to optimize the RAG system (including the retriever model 112).

The database server 108 operates to store and facilitate retrieval of various information used, generated, or collected by the application server 106 and the user devices 102a-102d in the database 110. For example, the database server 108 may store the various documents 116 from which relevant chunks of information may be extracted by the retriever model(s) 112. While the database server 108 and database 110 are shown here as being separate from the application server 106, the application server 106 may itself incorporate the database server 108 and the database 110.

Although FIG. 1 illustrates one example of a system 100 supporting generative machine learning, various changes may be made to FIG. 1. For example, the system 100 may include any number of user devices 102a-102d, networks 104, application servers 106, database servers 108, databases 110, retriever models 112, generative models 114, and documents 116. Also, these components may be located in any suitable locations and might be distributed over a large area. In addition, while FIG. 1 illustrates one example operational environment in which generative machine learning may be used, this functionality may be used in any other suitable system.

Figure 2:
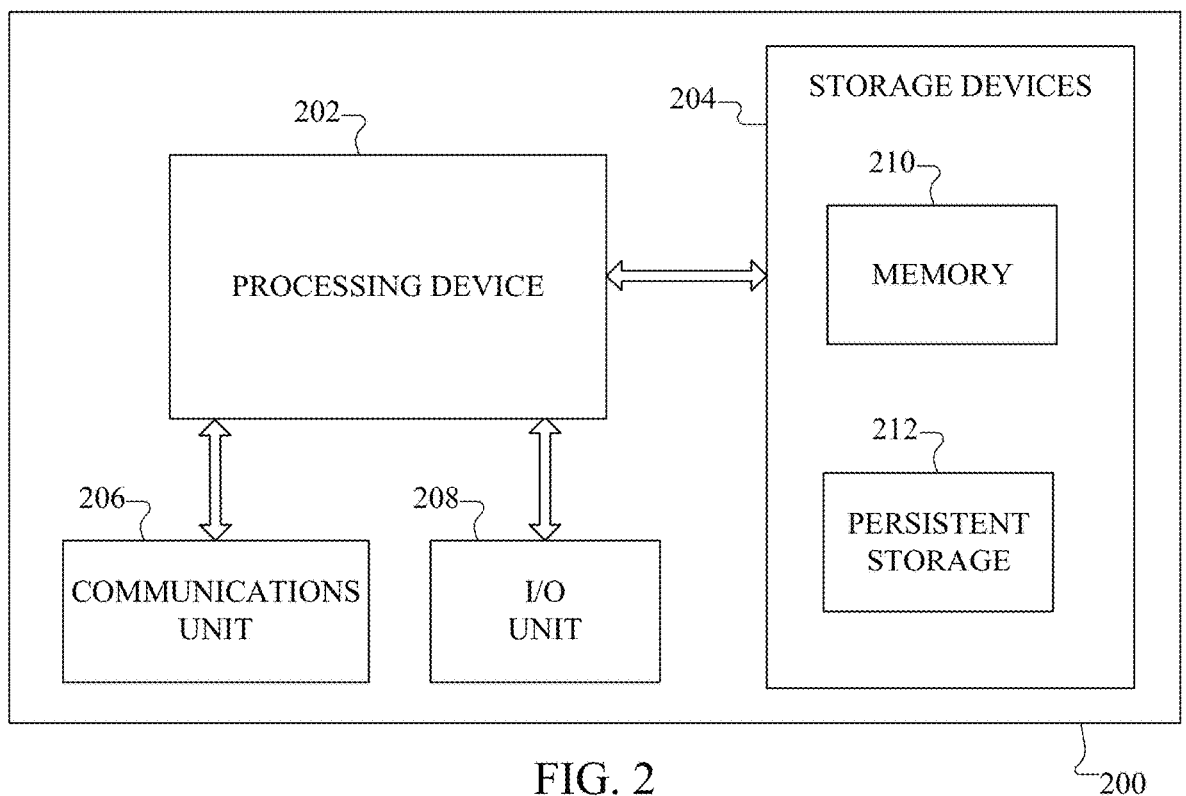
FIG. 2 illustrates an example device supporting generative machine learning according to this disclosure.

FIG. 2 illustrates an example device 200 supporting generative machine learning according to this disclosure. One or more instances of the device 200 may, for example, be used to at least partially implement the functionality of the application server 106 of FIG. 1. However, the functionality of the application server 106 may be implemented in any other suitable manner. In some embodiments, the device 200 shown in FIG. 2 may form at least part of a user device 102a-102d, application server 106, or database server 108 in FIG. 1. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), graphics processing units (GPUs), neural processing units (NPUs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). As a particular example, the communications unit 206 may support communication over the network(s) 104 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement or support the use of the retriever model(s) 112 and the generative model(s) 114. Thus, for example, the instructions executed by the processing device 202 may cause the device 200 to obtain user input queries, process the user input queries using one or more retriever models 112, pass prompts (which may include input queries and relevant information chunks) to one or more generative models 114, and process the relevant information chunks using the one or more generative models 114 to generate outputs for users that are responsive to the input queries. The instructions executed by the processing device 202 may also or alternatively cause the device 200 to optimize a RAG system that includes the retriever model(s) 112 and the generative model(s) 114 in a manner that allows refinement of both the retriever model(s) 112 and the generative model(s).

Although FIG. 2 illustrates one example of a device 200 supporting generative machine learning, various changes may be made to FIG. 2. For example, computing and communication devices and systems come in a wide variety of configurations, and FIG. 2 does not limit this disclosure to any particular computing or communication device or system.

Figure 3:
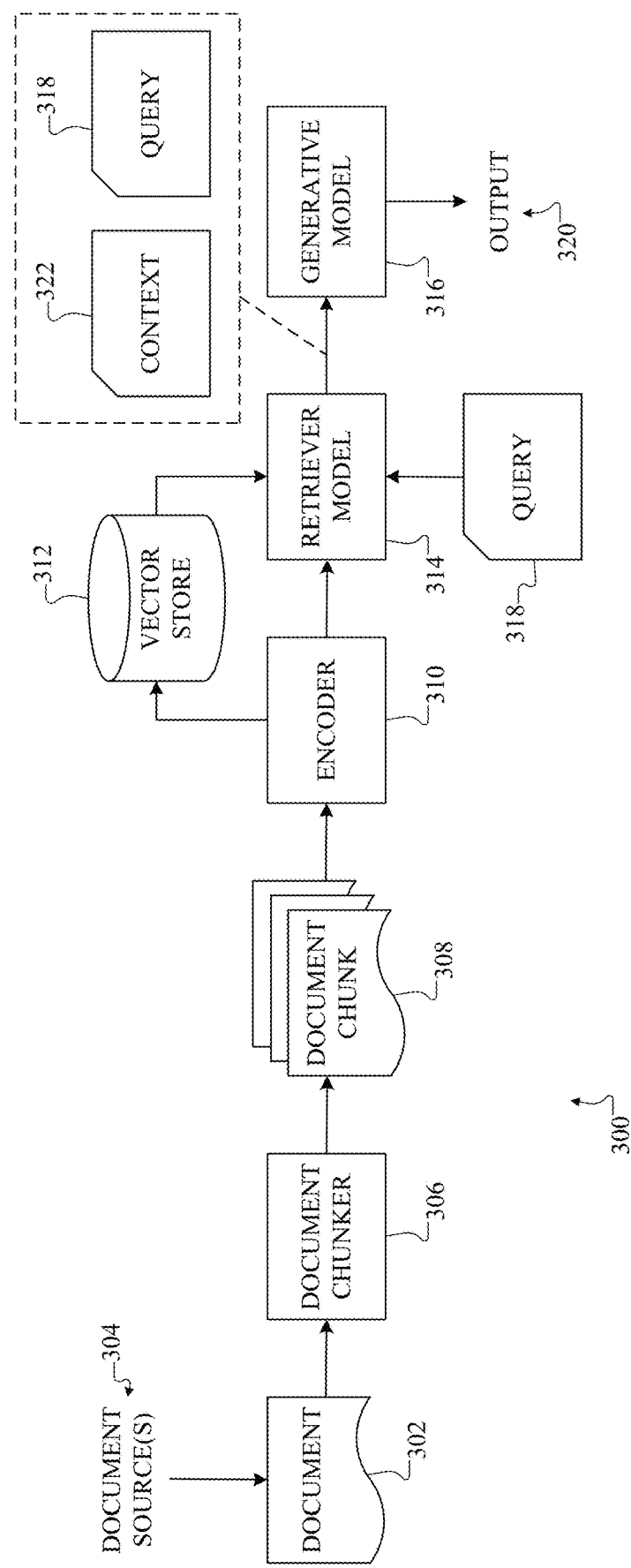
FIGS. 3 and 4 illustrate an example architecture supporting generative machine learning with a retriever having a reconfigurable sequence of rankers according to this disclosure.
Figure 4:
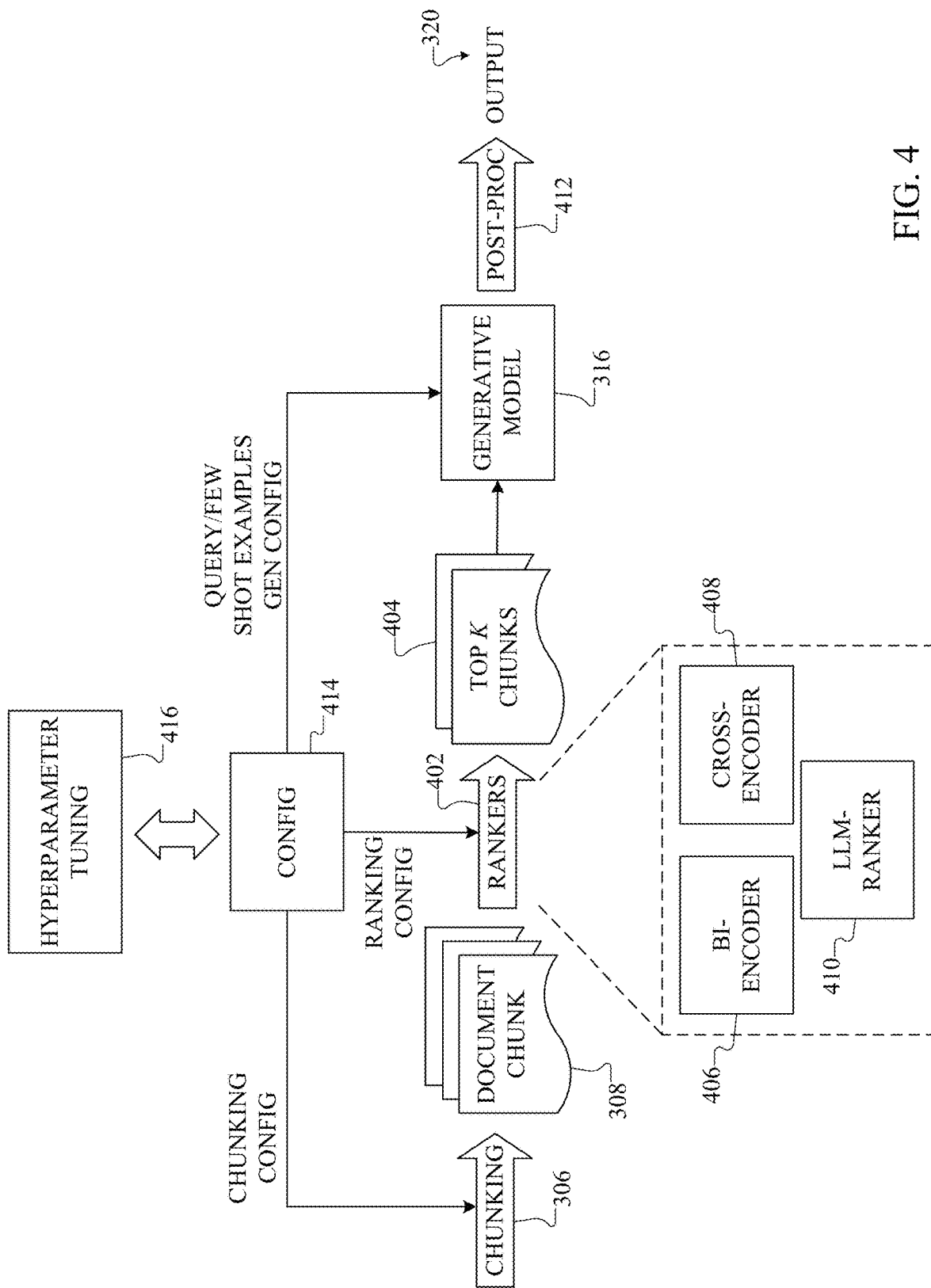

FIGS. 3 and 4 illustrate an example architecture 300 supporting generative machine learning with a retriever having a reconfigurable sequence of rankers according to this disclosure. For ease of explanation, the architecture 300 shown in FIGS. 3 and 4 is described as being implemented on or supported by the application server 106 in the system 100 shown in FIG. 1, where the application server 106 may be implemented using one or more instances of the device 200 shown in FIG. 2. However, the architecture 300 shown in FIGS. 3 and 4 may be implemented using any other suitable device(s) and in any other suitable system(s).

As shown in FIG. 3, the architecture 300 generally operates to receive and process various documents 302. Each document 302 represents a digital or scanned physical document, a website, or other collection of information. In some cases, for example, the documents 302 may include PDF or other scanned versions of physical documents, PDF or other digital documents, captured webpages, or other electronic files containing information that could be used by a generative model. The documents 302 here may be obtained from any suitable document source or sources 304, such as a cloud storage, local or remote database, or other source(s). As a particular example, the documents 302 may include or represent the documents 116 stored in the database 110.

Each document 302 in this example is provided to a document chunker 306, which represents a function that can be used to divide the documents 302 into document chunks 308 (also referred to as information chunks). Each document 302 can be split into one or more document chunks 308 depending on (among other things) the length/size of the document 302 and the size of each document chunk 308. In some cases, the document chunks 308 can have a fixed size. In other cases, the document chunks 308 can have variable or dynamic sizes. The document chunks 308 related to a single document 302 may or may not overlap with each other. When overlap exists, some information from the document 302 may be included in multiple document chunks 308. The document chunker 306 can use any suitable technique to split each document 302 into document chunks 308.

In some embodiments, the document chunks 308 are provided to at least one encoder 310, each of which generates embedding vectors that represent the contents of the document chunks 308 within an associated embedding space. Each embedding vector typically includes multiple numerical values that define a vector within the associated embedding space. The embedding vectors for more similar document chunks 308 are typically said to be closer within the embedding space, while the embedding vectors for less similar document chunks 308 are typically said to be farther apart within the embedding space. Any suitable measure of similarity may be used here to represent more similar or less similar embedding vectors, such as cosine similarity or Euclidean similarity. In some cases, an embedding space can represent a dense vector space. Each encoder 310 can use any suitable technique to generate embedding vectors representing document chunks 308.

In some cases, the embedding vectors can be stored for later use, such as in a vector store 312. The vector store 312 represents at least one database or other storage that can store the embedding vectors, often times along with the associated document chunks 308. Note, however, that the document chunks 308 need not be stored individually and that information defining the document chunks 308 may be stored, such as when information defining the document chunks 308 within each corresponding document 302 is stored so that the document chunks 308 can be retrieved from the corresponding documents 302.

Note that this process can occur for any suitable number of documents 302 and over any suitable time period. In some cases, for example, a number of documents 302 may be processed in the above manner, and the resulting embedding vectors can be stored. At that point, the embedding vectors may be subsequently used as described below. If desired, additional documents 302 may continue to be processed, and additional embedding vectors may continue to be stored and made available for further use as described below. Among other things, this may allow for continual improvements in the information that is available for use in the architecture 300.

The architecture 300 here also includes at least one retriever model 314 and at least one generative model 316. In some cases, each retriever model 314 may represent one of the retriever model(s) 112 shown in FIG. 1, and each generative model 316 may represent one of the generative model(s) 114 shown in FIG. 1. Each retriever model 314 receives user queries 318, and each generative model 316 generates outputs 320 that contain responses to the user queries 318. A retriever model 314 and a generative model 316 can collectively form a retrieval-augmented generation (RAG) system, which refers to a natural language processing (NLP) system that combines a trained generative model 316 (such as a large language model) with a retriever-reader architecture in the form of a trained retriever model 314. In this type of system, the retriever model 314 is used to identify document chunks 308 from a corpus that are relevant to each user query 318, and the generative model 316 is used to generate the response to the user query 318 contained in the associated output 320 based on the identified relevant document chunks 308.

In this type of approach, given an input text like a question (the user query 318), a retriever model 314 retrieves document chunks 308 that are relevant to the input text (such as from an external memory or external document), and a generative model 316 refers to the retrieved document chunks 308 to make a prediction like an answer to the question (the output 320). In FIG. 3, the retrieved document chunks 308 provided to the generative model 316 are said to form at least part of a context 322 associated with a user query 318, and both the user query 318 and the context 322 can be provided as inputs to the generative model 316. Collectively, the user query 318 and the context 322 can be said to form at least part of a prompt for the generative model 316. This approach helps the generative model 316 to ground the answers contained in its outputs 320 in order to mitigate issues like hallucinations and catastrophic forgetting.

In some embodiments, a RAG system formed using a retriever model 314 and a generative model 316 can be trained end-to-end, meaning the retriever model 314 and the generative model 316 can be trained together. Also, in some embodiments, a retriever model 314 may use a dense vector space to select document chunks 308, and a generative model 316 may represent a transformer-based model that is pre-trained on a large corpus. One innovative aspect of RAG is the use of a latent variable model to connect a retriever model 314 and a generative model 316. The latent variable model represents the document chunks 308 that the retriever model 314 can select, and the generative model 316 can generate outputs 320 based on selected document chunks 308. Note that while the encoder(s) 310 and the retriever model(s) 314 are shown here as separate components, it may be the case that a retriever model 314 implements an encoder 310 as part of the retriever model 314 itself.

One example implementation of a retriever model 314 is shown in FIG. 4, where the retriever model 314 is implemented using one or more rankers 402. Each ranker 402 can process document chunks 308 in order to identify the document chunks 308 that appear most relevant to each user query 318. Here, the most-relevant document chunks 308 that are identified by the ranker(s) 402 as a whole and that are provided to a generative model 316 are referred to as the "top K" document chunks 404, where K≥1. The specific number of most-relevant document chunks 308 identified by each ranker 402 may vary. In some cases, for example, the value of K can be dynamically adjusted for each ranker 402 based on a number of factors.

As shown in FIG. 4, various types of rankers 402 may be used in the retriever model 314. Three examples of rankers 402 shown here include at least one bi-encoder 406, at least one cross-encoder 408, and at least one LLM-ranker 410. The bi-encoder class of rankers represents transformer-based models that process input queries and document entities separately. This type of ranker generates independent embeddings (embedding vectors) for input queries 318 and document chunks 308, and the embeddings are used to compute similarities between the input queries 318 and the document chunks 308. Despite a lack of context understanding between an input query 318 and a document chunk 308 that might affect accuracy (compared to cross-encoder models), bi-encoder models offer high computational efficiency by facilitating concurrent processing of multiple input queries 318 and multiple document chunks 308.

The cross-encoder class of rankers represents transformer-based models that accept both an input query 318 and a document chunk 308 as a unified entity. A cross-encoder model's output is produced by evaluating an input query-document pair in one pass, which directly scores the document chunk 308. This means that the cross-encoder model does not generate embeddings like a bi-encoder model. Instead, the cross-encoder model generates a score representing how relevant the input query 318 is to a given document chunk 308. Despite providing a high-precision result due to the understanding of the context between the input query 318 and the document chunk 308, this type of ranker may contribute to a larger computational cost due to the individual processing of each input query-document pair.

The LLM-ranker class of rankers supports language model-based pointwise ranking. Pointwise ranking is a technique for text ranking that uses a large language model to assign a relevance score to each document chunk 308 given an input query 318 and ranks the document chunks 308 according to their relevance scores. This is different from list wise ranking, where the large language model directly generates a reordered list of documents or snippets based on their relative importance to an input query. While the LLM-ranker excels in accuracy, it concurrently exhibits large time or resource consumption compared to the other ranker models.

Note that while three types of rankers 402 are shown in FIG. 4, the specific ranker 402 or rankers 402 used in any given situation can vary. For example, in some embodiments, the architecture 300 can support a modular information retrieval subsystem that may be designed to contain a sequence of independent and interchangeable rankers 402. The sequence of rankers 402 used in any given situation can therefore vary in terms of which ranker 402 or rankers 402 are used, the order in which different rankers 402 are applied, or both. The design of this modular architecture 300 can provide flexibility and adaptability, allowing the adjustment of ranker sequence to cater to specific requirements (such as specific requirements related to precision and latency). It is therefore possible to apply one, two, or all three rankers 402 and in any suitable order as per precision and latency requirements of downstream tasks. As a particular example of this, it is possible to apply one ranker 402 to a large collection of document chunks 308 in order to select a first set of relevant document chunks 308, apply another ranker 402 to the first set of relevant document chunks 308 in order to select a second set of relevant document chunks 308, and apply yet another ranker 402 to the second set of relevant document chunks 308 in order to select a third and final set of relevant document chunks 308 (which may form the "top K" document chunks 404).

Regardless of which ranker 402 or rankers 402 are used, each ranker 402 may generally follow the same overall process. Each ranker 402 may be configured to score document chunks 308 based on their relevance with a user's input query 318. This results in a list of document chunks 308, which may be sorted by the score values that the ranker 402 applies. In some cases, this might be expressed mathematically as follows.

$$documents_{scored} = sorted(ranker(query, documents))$$

Once sorted, the top K document chunks 308 are selected from the sorted list. In some cases, this might be expressed mathematically as follows.

$$\text{Top-}K(documents) = documents_{scored}[:K]$$

The final top K document chunks 404 for a given user query 318 can be provided by a final one of the rankers 402 in the sequence being used by the retriever model 314 (or by the sole ranker 402 in the retriever model 314 if only one is currently being used by the retriever model 314).

As a particular example of this process, consider a scenario where (i) a document 302 includes one thousand document chunks 308 and (ii) an objective is to employ all three rankers 406-410 to extract the top five most-relevant document chunks 308 given a user query 318. In this example, it is possible to fine-tune the configuration within the architecture 300 so that the rankers 406-410 adhere to a desired sequential progression. For instance, a bi-encoder 406 may be used to select one hundred document chunks 308 from among the one thousand document chunks 308 that are most relevant to the user query 318. A cross-encoder 408 may be used to select twenty document chunks 308 from among the one hundred document chunks 308 that are most relevant to the user query 318. An LLM-ranker 410 may be used to select five document chunks 308 from among the twenty document chunks 308 that are most relevant to the user query 318. Those five document chunks 308 may be used as the "top K" document chunks 404 provided to a generative model 316, where K=5. Note that this particular progression of rankers 402 and the numbers of document chunks 308 identified by each ranker 402 are for illustration only.

A post-processing function 412 can be used in the architecture 300 to process results generated by the generative model 316 in order to produce the outputs 320. The post-processing function 412 may perform any suitable post-processing of the results generated by the generative model 316. In some cases, the post-processing of the results can be attribute-specific, meaning the specific type(s) of processing performed by the post-processing function 412 can vary based on the specific type(s) of data contained in the results generated by the generative model 316. As a particular example, when dates are provided as answers, an answer coming from the generative model 316 may be post-processed to have a standardized or other format (such as mm/dd/yyyy or dd/mm/yyyy). Other types of information contained in the results generated by the generative model 316 may be formatted or otherwise post-processed in other desired ways.

As shown in FIG. 4, a configuration function 414 can be used to configure one or more functions within the architecture 300, and the specific configuration currently being used by the configuration function 414 may be the result of hyperparameter tuning 416. The configuration function 414 can control any suitable aspect(s) of the architecture 300 based on the hyperparameter tuning 416. In this example, for instance, the configuration function 414 can control one or more aspects of the document chunker 306, such as by controlling the size of each document chunk 308. The configuration function 414 can also or alternatively control one or more aspects of the rankers 402, such as by controlling which of the ranker(s) 406-410 is or are used, the sequence in which two or more of the rankers 406-410 are applied, and/or the value of K for each ranker 406-410 being used.

The configuration function 414 can also or alternatively control one or more aspects of the generative model 316. For example, in some cases, it may be adequate for the generative model 316 to process a user query 318 and a context 322 formed using the top K document chunks 404 selected by the ranker(s) 402. However, in other cases, the generative model 316 might need additional information that exceeds the usual user query-context pair. In order to accommodate these circumstances, the architecture 300 can incorporate support for few-shot learning examples into its structure, which can involve the configuration function 414 providing one or several examples of how the generative model 316 should operate. As a particular example, the configuration function 414 may provide to the generative model 316 (i) at least one example user query-context pair and (ii) a desired output to be generated by the generative model 316 for each example user query-context pair. Among other things, this can be useful for user queries 318 that demand precise responses or additional instances from a user. By integrating few-shot learning examples into the architecture 300, a user can be enabled to provide supplementary evidence or other information for a user query 318 (if needed or desired). Following the integration of few-shot examples, a comprehensive prompt for the generative model 316 can be constructed, such as when the prompt includes (i) the initial user query 318, (ii) the context 322 extracted from the top K ranked document chunks 308, and (iii) one or more examples (which may or may not be provided by the user) if applicable. This multi-faceted approach can help to ensure a well-rounded understanding of the user query 318 and offer a more refined context 322, thereby augmenting the overall performance of the information retrieval process.

The performance of the architecture 300 can depend (among other things) on the choice of the parameter K in choosing the "top K" ranked document chunks 308 that are provided as the "top K" document chunks 404 to the generative model 316. In some embodiments, there are three or more rankers 402 used in series, where each ranker 402 in the series consumes the output of the previous ranker 402 (if any) and passes its top K document chunks 308 to the next operation in the pipeline (either the next ranker 402 or, in the case of the last ranker 402, the generative model 316). As a result, in these embodiments, there can be three or more discrete parameters K to tune.

It may be difficult to optimize even one such discrete parameter using analytical methods or reasoning, much less three or more such parameters (all of which can have unknown interactions). Therefore, in some embodiments, a general technique called a "grid search" can be used by the configuration function 414 to select the values of K used by the rankers 402. A grid search amounts to choosing values for each of the three or more parameters K simultaneously from a pre-defined grid and running the retriever model 314 and the generative model 316 end-to-end over a validation set that includes annotated document chunks 308. The annotations of the document chunks 308, once obtained, allow the accuracy of the architecture 300 (conditional on the particular choices of each K parameter) to be evaluated in a completely automated manner, such as by comparison of the generated outputs 320 with the annotations (which are considered as ground truths). Thus, the accuracy amounts to an objective function being optimizing, and the grid search can be used to simultaneously tune K rankers 402 in a series for use in the architecture 300.

Note that various other types of configurations may be supported in the architecture 300. For example, a retriever model 314 in the architecture 300 may be used to identify document chunks 308 containing specified fields of information for use by a generative model 316. Each individual field of information that is to be extracted from a document chunk 308 can have a different set of three or more optimal K parameters, and the architecture 300 can be designed to allow discovery of a different set of K parameters specific to each field of information. In some cases, the architecture 300 can also produce graphical representations of the landscape of the objective functions discovered by the grid searches. This may allow, for instance, a user to judge whether to use a different set of K parameters for each field of information, use one set of K parameters that work well enough for all fields of information, or use some approach intermediate between these two.

As another example, rather than using a fixed text chunk size, the architecture 300 may dynamically select the size of the document chunks 308. In some cases, the size of the document chunks 308 may be selected so that close to or all of the available context window of the generative model 316 can be used. In some cases, the ideal chunk size may vary inversely with K (because it is whatever part of the context window is available for all document chunks 308 divided by the K parameter of the final ranker 402) and the K parameters are being tuned. The documents 302 may need to be re-chunked and re-indexed potentially every time a different set of K parameters is evaluated in the grid search. Likewise, if multiple sets of K parameters are employed for different fields of information at deployment time, the document(s) 302 could potentially have to be re-chunked and re-indexed once for each field of information. While re-chunking may or may not be entirely avoided, the architecture 300 could include a module or function that plans the order of evaluations of both (i) different sets of K parameters and (ii) evaluations of different fields at deployment time. This may help to reduce or minimize the number of times chunking would have to be carried out, thus reducing or minimizing a source of inefficiency.

In this way, the architecture 300 provides various innovative enhancements to existing RAG frameworks and other generative machine learning frameworks. Among other things, these enhancements introduce a customizable pipeline that may incorporate one or more of the following features (note that one, some, or all of the following features may be provided in any specific implementation). As an example, the architecture 300 can support a modular approach for retriever models 314. Here, the architecture 300 incorporates a configurable sequence of rankers 402 (such as a bi-encoder 406, cross-encoder 408, and LLM-ranker 410), and each type of ranker 402 can rank a series of document chunks 308 based on their relevance to a specific query 318. The sequence of rankers 402 (such as which sequence of the three classes of rankers 406-410 to apply) can be selected based on any suitable requirement(s). As another example, the architecture 300 can support the addition of few-shot examples. That is, the architecture 300 has the ability to include few-shot examples for certain queries 318, such as those in which more comprehensive explanations might be required or desired. As still another example, the architecture 300 can support exploration to identify an optimal set of hyperparameters, which may be beneficial for swiftly integrating the architecture 300 into a downstream task. As yet another example, the architecture 300 can exhibit extensibility, allowing the architecture 300 to accept any model category for the rankers 402 and the generative model 316. This flexibility can enhance the adaptability of the architecture 300 to various tasks and requirements. Considering the fast pace at which the generative artificial intelligence (AI) field is developing, each class of ranker 402 and generative model 316 could have a better out-of-the-shelf alternative or a fine-tuned version that fits the requirement(s) of a downstream task better, so it is possible to easily replace that component with a superior alternative within the architecture 300.

There are a wide variety of use cases in which the architecture 300 may be applied. For example, the architecture 300 may be used to process a specific collection of documents 302 in order to generate answers to user queries 318 associated with those documents 302. In some cases, the documents 302 may represent documents used by a business or other organization, and the user queries 318 may be provided by employees or other personnel of the organization. As a particular example, the documents 302 may represent trust documents. A trust document is a document giving a person, another individual, or an institution the power to hold and manage the person's money or other assets for the benefit of the person or other individual. A trust document can serve many purposes, such as estate planning, tax planning, medical planning, and charitable giving.

For a specific embodiment of the architecture 300, assume that a highly-specialized corpus of documents 302 includes a number of trust documents that have each been annotated with different attributes. In some cases, for instance, each trust document may be annotated with a number of attributes and include fields like the trust's name, the trust's agreement date, the grantor or grantors' name(s), the trustee or trustees' name(s), and the state of the trust. The annotations may be obtained from any suitable source(s), such as one or more subject matter experts (SMEs) within the field of private wealth management or other suitable field. The task at hand may include identifying and extracting certain key information from these trust documents 302. The information that is extracted may be utilized for account opening, banking, margin/options, or any other or additional function(s).

One of the attributes that might be extracted is the agreement date of a trust document. To obtain the agreement date for a particular trust document, a user of the architecture 300 may provide an input query 318 asking for the agreement date of a particular trust document 302, the sequence of rankers 402 to be applied, and the search space for each ranker 402. The architecture 300 can operate by performing hyperparameter tuning 416 in order to identify an optimal K value for each type of ranker 402 in the specified sequence of rankers 402. The optimal values can be used to extract the top K document chunks 404 provided by the sole or last ranker 402, and these document chunks 404 can be attached as a context 322 to a prompt (along with the user's input query 318). A generative model 316 can be prompted and, at the end of the process, the desired answer may be provided as an output 320 to the user.

This type of use case illustrates various benefits or advantages of the architecture 300. For example, using traditional approaches, this use case might require the development and deployment of a large number of machine learning models, such as one machine learning model for extracting each of the identified attributes from the trust documents 302. Thus, for instance, if there are twenty attributes, traditional approaches might require the use of twenty different machine learning models. Moreover, each of those different machine learning models would need to be trained using large amounts of training data, and each of those different machine learning models would need to be deployed and maintained over time. In addition, traditional approaches can have a prolonged development lifecycle. The architecture 300 can overcome these types of issues by using a handful of trained machine learning models, which can be trained end-to-end using a much smaller amount of training data. Also, the same machine learning models can be used by modifying the prompts that are provided to the generative model 316. In addition, the architecture 300 supports rapid experimentation with the hyperparameters and few-shot examples in order to learn over time how prompts can be generated and used to obtain accurate outputs 320.

Note that the use of the architecture 300 to analyze trust documents is one example application of the architecture 300 and that the architecture 300 may be used in any other suitable manner. For example, the architecture 300 may be used to analyze earnings call transcripts or other transcripts and answer input queries 318 about the contents of the transcripts. In general, the architecture 300 is not limited to processing any specific type(s) of documents 302 or responding to any specific type(s) of input queries 318.

Although FIGS. 3 and 4 illustrate one example of an architecture 300 supporting generative machine learning with a retriever having a reconfigurable sequence of rankers, various changes may be made to FIGS. 3 and 4. For example, various components or functions in FIGS. 3 and 4 may be combined, further subdivided, replicated, omitted, or rearranged and additional components or functions may be added according to particular needs.

Figure 5:
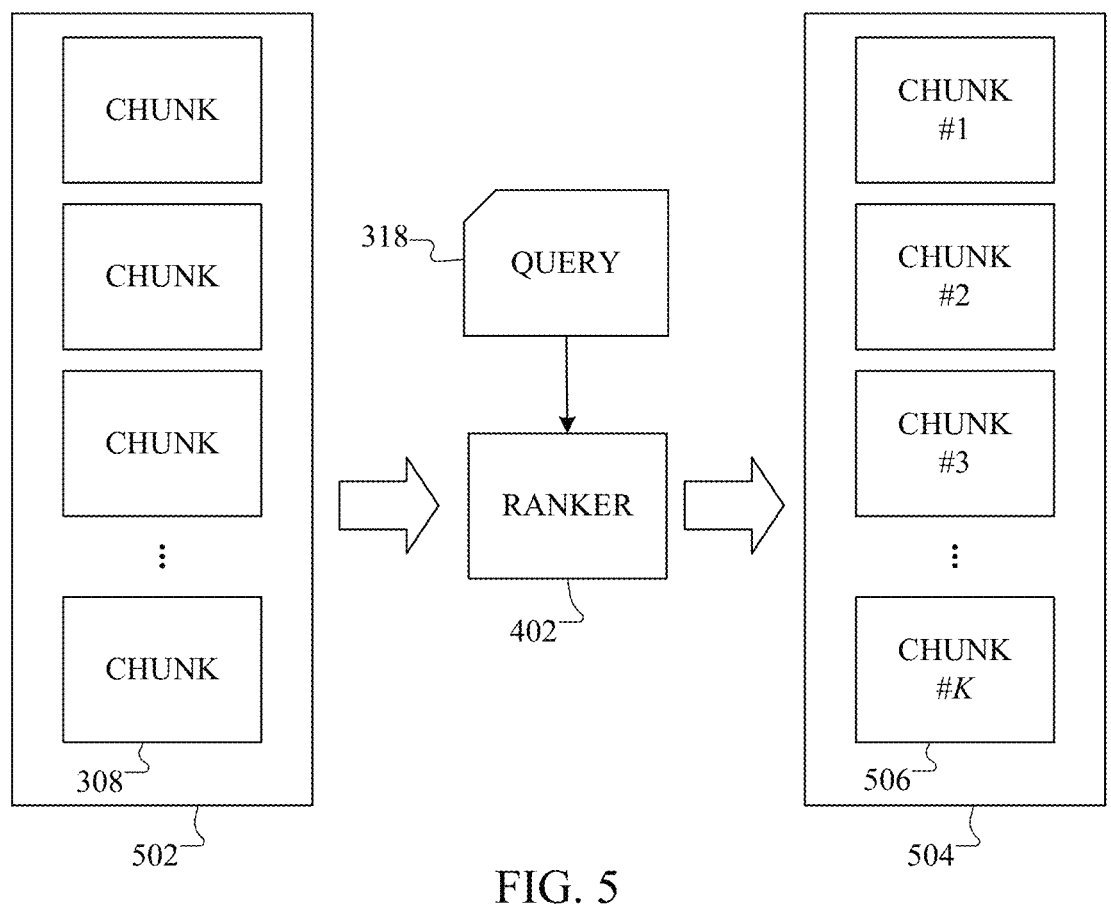
FIG. 5 illustrates example operation of a ranker used to support generative machine learning according to this disclosure.

FIG. 5 illustrates example operation of a ranker 402 used to support generative machine learning according to this disclosure. For ease of explanation, the ranker 402 shown in FIG. 5 is described as being used by the application server 106 in the system 100 shown in FIG. 1, where the application server 106 may be implemented using one or more instances of the device 200 shown in FIG. 2 and may use the architecture 300 shown in FIGS. 3 and 4. However, the ranker 402 shown in FIG. 5 could be used with any other suitable device(s) and architecture(s) and in any other suitable system(s).

As shown in FIG. 5, the ranker 402 is configured to receive and process a set 502 of document chunks 308 or embedding vectors associated with the set 502 of document chunks 308. The ranker 402 can determine which of the document chunks 308 appear to be most relevant to an associated user query 318. In some cases, for example, the ranker 402 can determine a similarity score between each document chunk 308 and the associated user query 318 and rank the document chunks 308 based on their scores. The ranker 402 can select the top K document chunks 308 and provide them as a set 504 of top K document chunks 506. If the ranker 402 is being used by itself (without any other rankers 402) or the ranker 402 represents the last ranker 402 in a sequence, the set 504 of top K document chunks 506 may represent the top K document chunks 404 that are provided to the generative model 316 as a context 322. In particular embodiments, the top K document chunks 506 in the set 504 can be ranked by their similarity scores, such as when higher document chunks 506 in the set 504 have larger similarity scores (more similarity to the query 318) and lower document chunks 506 in the set 504 have smaller similarity scores (less similarity to the query 318).

A generative model 316 often interfaces with users through textual inputs, and an input query 318 and its associated context 322 typically form at least part of a prompt for the generative model 316. The prompt often includes a question, input data, instructions, and optionally one or more examples (shots) and/or synthetic data (such as to help train a smaller generative model 316). Bad prompts can produce suboptimal performance by the generative model 316, while good prompts can often provide surprising results. Prompt engineering refers to the process of structuring prompts for generative models so that the generative models consistently produce suitable results. Prompt engineering can be a complex task and often involves the ability to experiment with the use of different instructions (such as express intents precisely to a generative model), different examples or shots (including the selection and ordering of the shots), different generative models, chains of multiple prompts (to achieve higher-order tasks), guardrails to avoid hallucinations (such as self-consistency sampling), and different utilities (such as efficient indexing of text data or querying external sources). Manual experimentation for production-grade model performance can be tedious and suboptimal.

The architecture 300 can support an automated pipeline for rapid experimentation and production of suitable prompts for a generative model 316. As described above, for example, the configuration function 414 can configure one or more functions within the architecture 300, and the hyperparameter tuning 416 can be used to set various hyperparameters associated with the architecture 300. This can include the number of top K document chunks 404 provided to the generative model 316 and the number of shots optionally provided to the generative model 316. The hyperparameter tuning 416 can also be used to vary the ordering of the top K document chunks 404, vary the ordering of the shots, control whether one or more prompts are provided to the generative model 316 for a user query 318, or control other aspects of how the prompts are generated. In some cases, this may allow an initial prompt formulation to be used (such as based on an initial investigation that provides data understanding and problem formulation) and then experimental iterations/optimizations to improve production viability of the architecture 300.

Although FIG. 5 illustrates one example of operation of a ranker 402 used to support generative machine learning, various changes may be made to FIG. 5. For example, the set 502 of document chunks 308 may represent an initial set of document chunks 308 or a narrowed set of document chunks 308 identified by a previous ranker 402 in a sequence of rankers. Similarly, the set 504 of document chunks 506 may represent the top K document chunks 404 for the generative model 316 or a narrowed set of document chunks 308 identified for a subsequent ranker 402 in a sequence of rankers.

Figure 6:
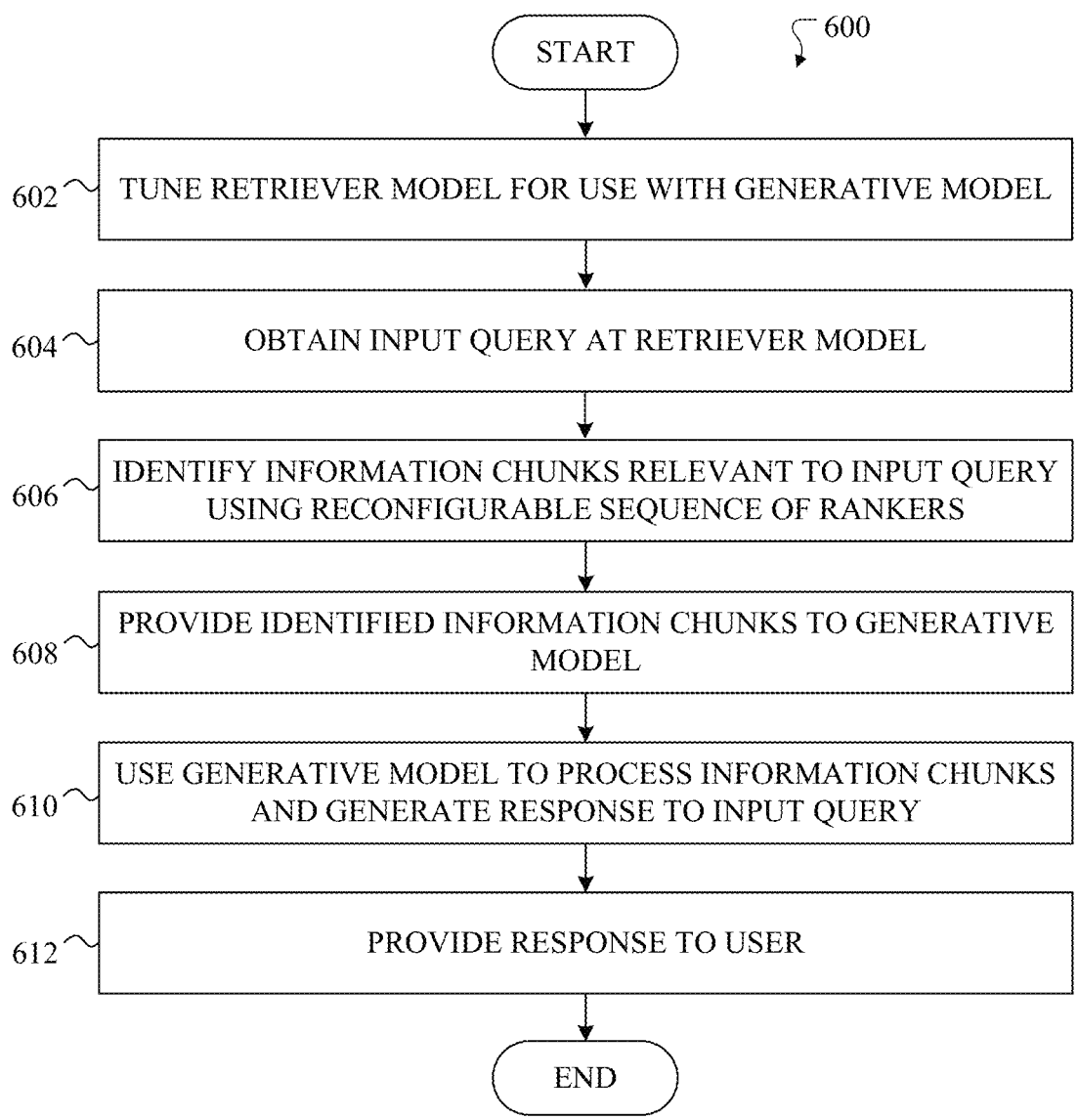
FIG. 6 illustrates an example method for generative machine learning with a retriever having a reconfigurable sequence of rankers according to this disclosure.

FIG. 6 illustrates an example method 600 for generative machine learning with a retriever having a reconfigurable sequence of rankers according to this disclosure. For ease of explanation, the method 600 shown in FIG. 6 is described as being performed by the application server 106 in the system 100 shown in FIG. 1, where the application server 106 may be implemented using one or more instances of the device 200 shown in FIG. 2 and may use the architecture 300 shown in FIGS. 3 and 4. However, the method 600 shown in FIG. 6 could be performed using any other suitable device(s) and architecture(s) and in any other suitable system(s).

As shown in FIG. 6, a retriever model is tuned for use with a generative model at step 602. This may include, for example, the processing device 202 of the application server 106 setting one or more hyperparameters associated with a retriever model 314. In some embodiments, the retriever model 314 includes a reconfigurable sequence of one or more rankers 402 selected from among a plurality of rankers 402, where each ranker 402 is configured to identify a specified number of document chunks 308. As a particular example, the retriever model 314 can determine the number of document chunks 308 to be identified by each ranker 402 in the reconfigurable sequence. In some cases, the number of document chunks 308 to be identified by each ranker 402 may be determined using a grid search. As another example, the retriever model 314 may be tuned to dynamically select a size of the document chunks 308 to be provided to the generative model 316. As yet another example, the retriever model 314 may be tuned to process different fields of information in document chunks 308 differently.

An input query is obtained at the retriever model at step 604, and information chunks relevant to the input query are identified using the reconfigurable sequence of rankers of the retriever model at step 606. This may include, for example, the processing device 202 of the application server 106 providing a query 318 to the retriever model 314. This may also include the processing device 202 of the application server 106 using the retriever model 314 to identify the top K document chunks 404 that are most similar to the query 318. The specific ranker(s) 402 used here and/or the sequence of multiple rankers 402 used here can vary depending on the configuration of the retriever model 314. In one configuration, for instance, the bi-encoder 406 may identify a first subset of document chunks 308 from a larger corpus, the cross-encoder 408 may identify a second subset of document chunks 308 from the first subset of document chunks 308, and the LLM-ranker may identify a third subset of document chunks 308 from the second subset of document chunks 308. The third subset of document chunks 308 may represent the top K document chunks 404.

The identified information chunks are provided to the generative model at step 608, and the generative model is used to process the identified information chunks and generate a response to the input query at step 610. This may include, for example, the processing device 202 of the application server 106 providing the query 318 and a context 322 (the top K document chunks 404) to the generative model 316. This may also include the processing device 202 of the application server 106 using the generative model 316 to generate an output 320 containing an answer to the query 318. The response is provided to the user at step 614. This may include, for example, the processing device 202 of the application server 106 initiating presentation of the output 320 generated by the generative model 316 on a user device 102a-102d associated with the user.

Although FIG. 6 illustrates one example of a method 600 for generative machine learning with a retriever having a reconfigurable sequence of rankers, various changes may be made to FIG. 6. For example, while shown as a series of steps, various steps in FIG. 6 may overlap, occur in parallel, occur in a different order, or occur any number of times (including zero times).

As described above, it is possible to optimize individual components of a system that includes a large language model, but it can be difficult to optimize other components of the system used with a large language model. For example, general large language models are typically trained on the task of next-token prediction using unrestricted general corpora, and their outputs frequently do not align in various ways with what human users want. As a result, several methods have been developed to better align the outputs of a large language model based on human feedback or updates to a policy used by the large language model. Often times, these methods are said to incorporate some type of reward-based feedback to the large language model.

While reward-based feedback can be effective for optimizing a large language model individually, the same approach typically cannot be used to improve the performance of other components used with the large language model. For example, in a retrieval-augmented generation (RAG) architecture, a retriever model can be used with a large language model, and the performance of the retriever model generally cannot be improved using reward-based feedback methods applied to the large language model. Among other reasons, this is because the reward-based feedback methods applied to the large language model often generate candidate responses for a given prompt to the large language model using sampling, and standard retriever models (unlike generative models) do not naturally incorporate any sampling mechanisms. Without such a sampling mechanism, there is no set of candidate responses from the retriever model for reward-based feedback to be generated. Since reward-based feedback is used by the large language model to ultimately learn and improve its outputs, this prevents reward-based feedback from being used to improve the retriever model.

The following now describes potential modifications that might be made in the architecture 300 or other machine learning-based architecture to support reward-based feedback for RAG optimization. In some cases, query augmentation may be used to help optimize the architecture 300 or other machine learning-based architecture. For example, multiple versions of an original query 318 may be generated by a large language model (such as the generative model 316 or other large language model). Each version of the original query 318 can be used to perform independent retrieval of document chunks 308, and the results for all versions of the query 318 can be combined (such as by using rank fusion). In other cases, listwise reranking may be used to help optimize the architecture 300 or other machine learning-based architecture. For instance, after an initial retrieval of a list of K document chunks 308 is performed, k document chunks 308 can be sampled from K (where k<<K). A large language model (such as the generative model 316 or other large language model) can be prompted to perform a listwise reranking of the k items, and the results can be combined (such as by using rank fusion). Note that these two modifications can be applied to any standard retrieval pipeline independently, and it is also possible to use a combination of query augmentation and listwise reranking.

Figure 7:
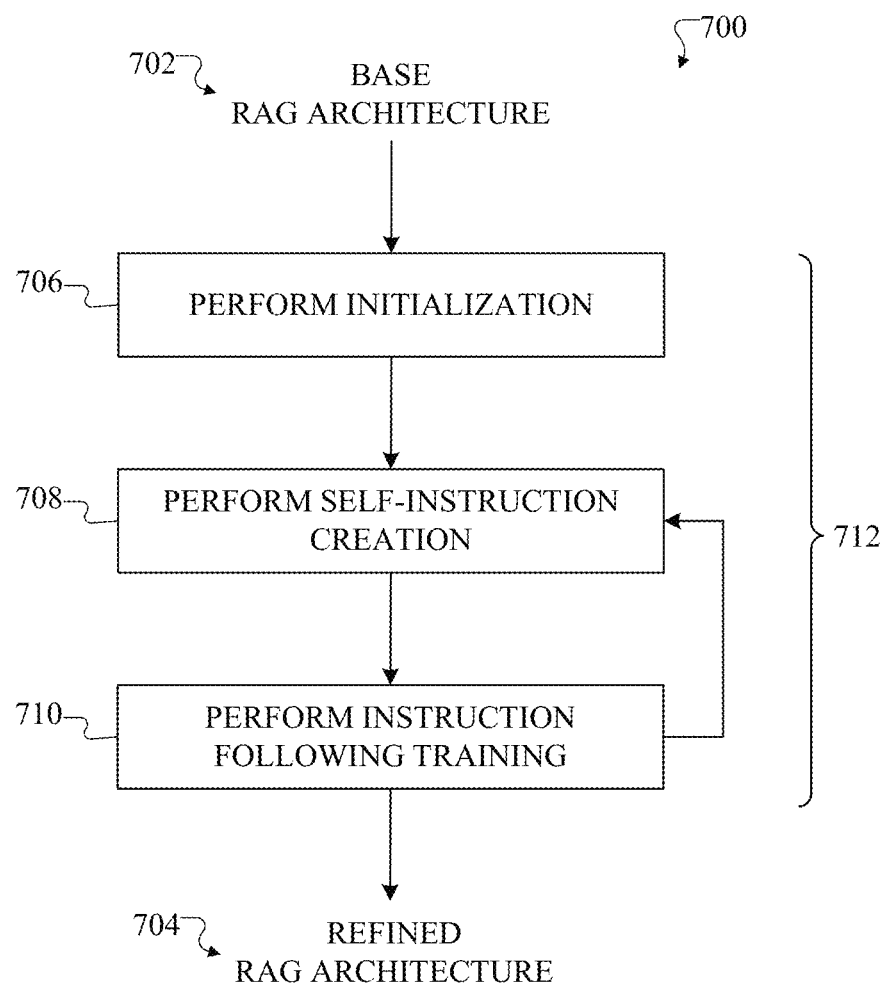
FIG. 7 illustrates an example architecture supporting retrieval-augmented generation (RAG) system optimization according to this disclosure.

FIG. 7 illustrates an example architecture 700 for retrieval-augmented generation (RAG) system optimization according to this disclosure. As shown in FIG. 7, the architecture 700 begins with a base RAG architecture 702 and supports self-rewarding optimization to generate a refined RAG architecture 704. The base RAG architecture 702 generally represents a machine learning architecture that includes a retriever model and a generative model. In some cases, the base RAG architecture 702 may represent at least part of the architecture 300 described above, such as when the base RAG architecture 702 includes at least a retriever model 314 and a generative model 316. The refined RAG architecture 704 generally represents a machine learning architecture in which the retriever model and the generative model have both been optimized to some extent via self-rewarding optimization.

As shown in this example, there are three general functions of the optimization process performed by the architecture 700, namely an initialization function 706, a self-instruction creation function 708, and an instruction following training function 710. These functions 706-710 can be performed iteratively as part of an overall self-alignment algorithm 712. Note that this approach is based on the techniques described in Yuan et al., "Self-Rewarding Language Models," arvix.org, February 2024 (which is hereby incorporated by reference in its entirety). However, that technique is modified here to support the optimization of the retriever model 314 as well as the generative model 316 in the base RAG architecture 702.

During the initialization function 706, seed instruction following data and seed LLM-as-a-Judge instruction following data can be created. Regarding the former, in some cases, a seed set of human-authored (instruction prompt, response) general instruction following examples can be obtained for training in a supervised fine-tuning (SFT) manner, such as starting from a pretrained base model (like the base RAG architecture 702). This data is referred to as instruction fine-tuning (IFT) data. Regarding the latter, in some cases, a seed set of (evaluation instruction prompt, evaluation result response) examples that can also be used for training may be obtained. While this is not strictly necessary, a model using IFT data may already be capable of training an LLM-as-a-Judge, and it can be shown that such training data can give improved performance. In this data, an input prompt asks the generative model 316 to evaluate the quality of a given response to a particular instruction, and the provided evaluation result response may include a chain-of-thought reasoning (a justification) followed by a final score (such as out of a maximum score of five). Example response evaluation criteria may include relevance, coverage, usefulness, clarity, and expertise. This data is referred to as evaluation fine-tuning (EFT) data.

During the self-instruction creation function 708, the base RAG architecture 702 (during an initial iteration) or a modified RAG architecture (from a prior iteration) can be used to self-modify its own training data. Specifically, additional training data can be generated for the next iteration of training in the following manner.

1. Generate a new prompt xi using few-shot prompting, sampling prompts from the original seed IFT data.

2. Generate m sets of n queries, where each set can be generated by presenting the generative model 316 with a prompt like "Given the query $q, generate n-1 similar queries to it." This causes the generative model 316 to produce additional queries that are similar to each example query. This can be performed m times with sampling to produce the following queries.

$$q = q_{11}, \ldots q_{1n}$$

$$\ldots$$

$$q = q_{m1}, \ldots, q_{mn} \quad (1)$$

For purposes of this discussion, fix a query $q=q_1$. The query could be supplied by human subject matter experts, synthetically generated, or obtained in any other suitable manner. It may be assumed here that the generated queries are normalized and deduplicated within the same sampling instance to avoid queries within the same sampling instance that are (nearly) identical. After deduplication, the value of n may not be the same between the different lists of sampled queries, but for simplicity this condition is assumed below. Note that step (2) here is described in further detail below.

3. Generate N diverse candidate responses $\{y_i^1, \ldots, y_i^N\}$ for the given prompt xi from the generative model 316 using sampling.

4. Evaluate the candidate responses using the LLM-as-a-Judge to determine the ability of the generative model 316 to evaluate its own candidate responses, such as by using rewards $r_i'' \in [0, 5]$.

During the instruction following training function 710, training may initially be performed with the seed IFT and EFT data. This is then augmented with additional data via AI (self-) feedback during subsequent iterations. For example, after performing the self-instruction creation procedure, an AI feedback training procedure may be used. During this procedure, the seed data can be augmented with additional examples for training, which is referred to as AI feedback training (AIFT) data. To do this, preference pairs can be constructed, where the preference pairs are training data in the form (instruction prompt xi, winning response $y_i^w$, and losing response $y_i^l$). To form the winning and losing pair, the highest and lowest scoring responses from N evaluated candidate responses can be selected, and the pair can be discarded if these two scores are the same. These pairs can be used for training with a preference tuning algorithm, such as direct preference optimization (DPO).

The overall self-alignment algorithm 712 here can be used to train a series of models $M_1, \ldots, M_T$, where each successive model t uses augmented training data created by the $(t-1)^{th}$ model. It is possible to define $AIFT(M_T)$ to refer to AI feedback training data created using model $M_T$. Based on this, the models and the training data used can be defined as follows. The model $M_0$ can represent the base RAG architecture 702 with no fine-tuning. The model $M_1$ can represent the base model $M_0$ that is fine-tuned using the IFT and EFT seed data during SFT. The model $M_2$ can be initialized as the model $M_1$ and then trained with $AIFT(M_1)$ data using DPO, the model $M_3$ can be initialized as the model $M_2$ and then trained with $AIFT(M_2)$ data using DPO, and so on. The final model that is trained can represent the refined RAG architecture 704.

Regarding step (2) performed during the self-instruction creation function 708, as a matter of notation, if a prompt template eliciting query-augmentation is represented as "f", the instantiation of the prompt with q can be denoted as "f(\$q)". To be clear, each of the lines in Equation (1) can be generated by running the generative model 316 over an identical prompt f(\$q), the only difference between the outputs 320 being created by different sampling during the decoding phase. For a fixed $i \in [1,m]$, each of the queries $q_{i,j}$ for $j \in [1,n]$ can be issued to the retriever model 314 (for a total of m×n calls to the retriever model 314 over all values of i), and the top K document chunks 404 from issuing the queries $q_{i,j}$ for $j \in [1,n]$ can be aggregated into a ranked list. Note that while this may not satisfy constraints on latency needed for a deployed RAG system, this process may be run only as part of optimizing the RAG system. In some cases, the aggregation could be performed using reciprocal rank fusion. This produces, from each augmented-query list, a set or list of k documents. Using the original query q and a RAG prompting template (such as "Answer the query \$q on the basis of the documents $\$d_{i1}, \ldots, \$d_{ik}$"), m prompts are obtained, possibly with some overlap between the document sets among the different prompts. The prompt in line/experiment i can be denoted as $p_i$. In step (4) performed during the self-instruction creation function 708, the generative model 316 (now acting as an answer-generator) can be used with sampling to produce/answers to each prompt and to evaluate each one of these answers into a reward $r^{i,j} := r(a_{i,j})$. This can result in the following.

$$q = q_{1,1}, \ldots q_{1,n} \rightarrow d_{1,1}, \ldots d_{1,k} \rightarrow p_1 \rightarrow a_{1,1}, \ldots$$
$$a_{1,t} \rightarrow r^{1,1}, \ldots r^{1,t}$$

$$q = q_{m,1}, \ldots, q_{m,n} \rightarrow d_{m,1}, \ldots d_{m,k} \rightarrow p_m \rightarrow a_{m,1} \ldots$$
$$a_{m,r} \rightarrow r^{m,1}, \ldots r^{m,t} \quad (2)$$

It should be noted that any method of using the generative model 316 to generate the rewards could be used here. In some cases, the generative model 316 may be used to directly elicit a reward $r^{i,j}$, such as by asking the generative model 316 to generate a reward within a specific range of values (such as [0, 5]). In other cases, more indirect methods may be used, such as asking the generative model 316 to make comparisons only between the generated answers and then applying a Bradley-Terry model to other technique to derive implicit ratings from the comparisons.

This data may then be used to construct AIFT data for use during the subsequent instruction following training function 710. In some cases, the AIFT data may include at least two distinct parts. One distinct part of the AIFT data can represent preference pairs $(p_i, a_i^w)$, $(p_i, a_i^l)$ that include winning and losing answers within the same prompt's set of answers. For these preference pairs, the construction of the preference pairs is self-explanatory, and the criterion for inclusion of these potential preference pairs may be that the rewards are ordered $r(a_i^w) > r(a_i^l)$.

Another distinct part of the AIFT data can represent preference pairs $(f(\$q), q_{i,j_1}^w)$, $(f(\$q), q_{i,j_2}^l)$ that include winning and losing query rephrasings associated with different prompts (meaning $j_1 \neq j_2$). For these preference pairs, the construction of these preference pairs can occur as follows. Define $\rho^i = \max_j r^{i,j}$, which considers the reward assigned to each prompt $p_i$ to be the maximum among the rewards given to its sampled answers. Denote the corresponding argmax (the answer or more generally concatenated answers) corresponding to $\rho^i$ as $\hat{a}_i$. Recenter (normalize) the original $\rho_i$ so that $\text{mean}_i (\rho^i) = 0$, and denote the new $\rho^i$ using the same notation. For i such that $\rho^i > 0$, assign a reward $r(d_{i,j})$ to $d_{i,j} \in \{0, \rho^i\}$ as follows. Prompt the generative model 316 to list which passages in the top K document chunks 404 $d_{i,1}, \ldots d_{i,k}$ are used in determining the answer $\hat{a}_i$, and set $r(d_{i,j}) := \rho^i$ if it appears in the response as being useful in formulating the final answer (otherwise set $r(d_{i,j})=0$). Propagate the reward $r(d_{i,j}) > 0$ back to each $q_{i,h}$ (where the range of h is $1 \leq h \leq m$) according to how much they contributed to the placement of $d^{i,j}$ in the $i^{th}$ list of results. The exact details here can depend on the technique that is used for rank fusion. For example, if the rank fusion technique is reciprocal rank fusion, an appropriate formula for use in determining the reward $r(d_{i,j})$ can be expressed as follows.

$$r(q_{i,h}) := \sum_{j=1,\ldots,k} \frac{1}{\text{rank}_h(d_{i,j})} r(d_{i,j}) \quad (3)$$

Here, the rank of $d_{i,j}$ in the search results of $q_{i,h}$ is defined as infinity (so its reciprocal is defined as zero) in cases where $d_{i,j}$ does not appear in the search results of $q_{i,h}$. Since the same query may appear in multiple generated lists of queries, the rewards for the occurrences $q_{i,h}$ of the same query can be aggregated to determine the final reward of each $q_{i,j}$. Some experimentation may be performed regarding the aggregation technique since (i) summing the rewards may unduly reward queries that are generated many times in many different samplings, thus reinforcing the current behavior of the generative model 316, and (ii) averaging the rewards may reward "lucky" queries too much and thereby introduce too much variance. The criterion for inclusion of these potential preference pairs may be that the rewards are ordered $r(d_{i,j_1}^w) > r(q_{i,j_1}^l)$.

The following provides a rationale for various steps included in the process performed by the architecture 700. First, it may be considered that the reward of a prompt (with retrieved document chunks) can be the reward of its best generation, as a prompt should not be penalized by any bad-sampled generations but considered as good as its best generation. Second, the inclusion of a document chunk 308 in a prompt may be considered to provide more information to a generative model 316, and the value of the document chunk 308 is the degree to which the information can be used by the generative model 316 to improve its response above the average response in the set. One underlying assumption here may be that any document chunk 308 can only add information and not confuse the generative model 316, although this is not necessarily true in all situations. In other situations, for instance, negative rewards might be assigned to some document chunks 308 based on their more-frequent inclusion in "below-average" prompts.

Overall, the architecture 700 can provide for the self-improvement of RAG pipelines as a whole. One or both of query-augmentation prompts and question-answering prompts can be sampled multiple times, and each one of those samples can be evaluated. For each sampling and answer generation, the prompt can also instruct the generative model 316 to point out which passage(s) among the top K document chunks 404 that the generative model 316 received were used in generating a response. Preferences of an evaluation model among the final answers can be propagated back mechanistically to the generation of augmented queries. As a result, a query augmentation that results in better rephrasings, better search results, and better evaluated answers (which use the query augmentation's result as a basis for the answer) can be rewarded more than a query augmentation that results in inferior rephrasings, inferior search results, or worse evaluated answers.

Note that the inclusion of multiple individual generative model generations in obtaining an answer to one query may make such a self-optimizing RAG pipeline unfeasible to deploy in a production environment, where many concurrent users may be expected and where certain latency and throughput requirements may be imposed. However, the query augmentation approach and/or the listwise reranking approach may not need to be deployed into a production environment. Rather, an augmented retrieval system can be used to generate a large quantity of training data of high quality (or at least of significantly higher quality than that of the base RAG architecture 702) using the query augmentation approach and/or the listwise reranking approach, and this training data can be used to retrain/retune the parameters of the base RAG architecture 702.

Also note that a dataset including raw documents and a seed set of questions/answers used by the architecture 700 may be as diverse and challenging as possible in order to obtain the most generally-applicable RAG system and give the most room for demonstrating improvements over the base RAG architecture 702. Such a seed set of questions/answer may also allow for periodic "independent" evaluation of the refined RAG architecture 704, such as to show that the architecture 700 truly does achieve better results in each round of self-improvement and is not just learning to reinforce its initial biases. Since it is notoriously difficult and time-consuming to source high-quality questions/answers, in some cases a small set of raw documents 302 (such as about fifty public credit agreements or other documents) may be used. As a seed set, a number of questions (such as about fifty questions) may be answered by subject matter experts. As optimization progresses, more questions can be synthesized, the existing RAG architecture can be used to attempt to answer these questions, and "junior" subject matter experts may be trained by in-house subject matter experts to review the resulting question/answer pairs for accuracy and to correct any that are incorrect in order to grow the seed/evaluation set in size and diversity. Note, however, that is approach is for illustration only and can easily vary.

Although FIG. 7 illustrates one example of an architecture 700 for RAG system optimization, various changes may be made to FIG. 7. For example, various components or functions in FIG. 7 may be combined, further subdivided, replicated, omitted, or rearranged and additional components or functions may be added according to particular needs.

Figure 8:
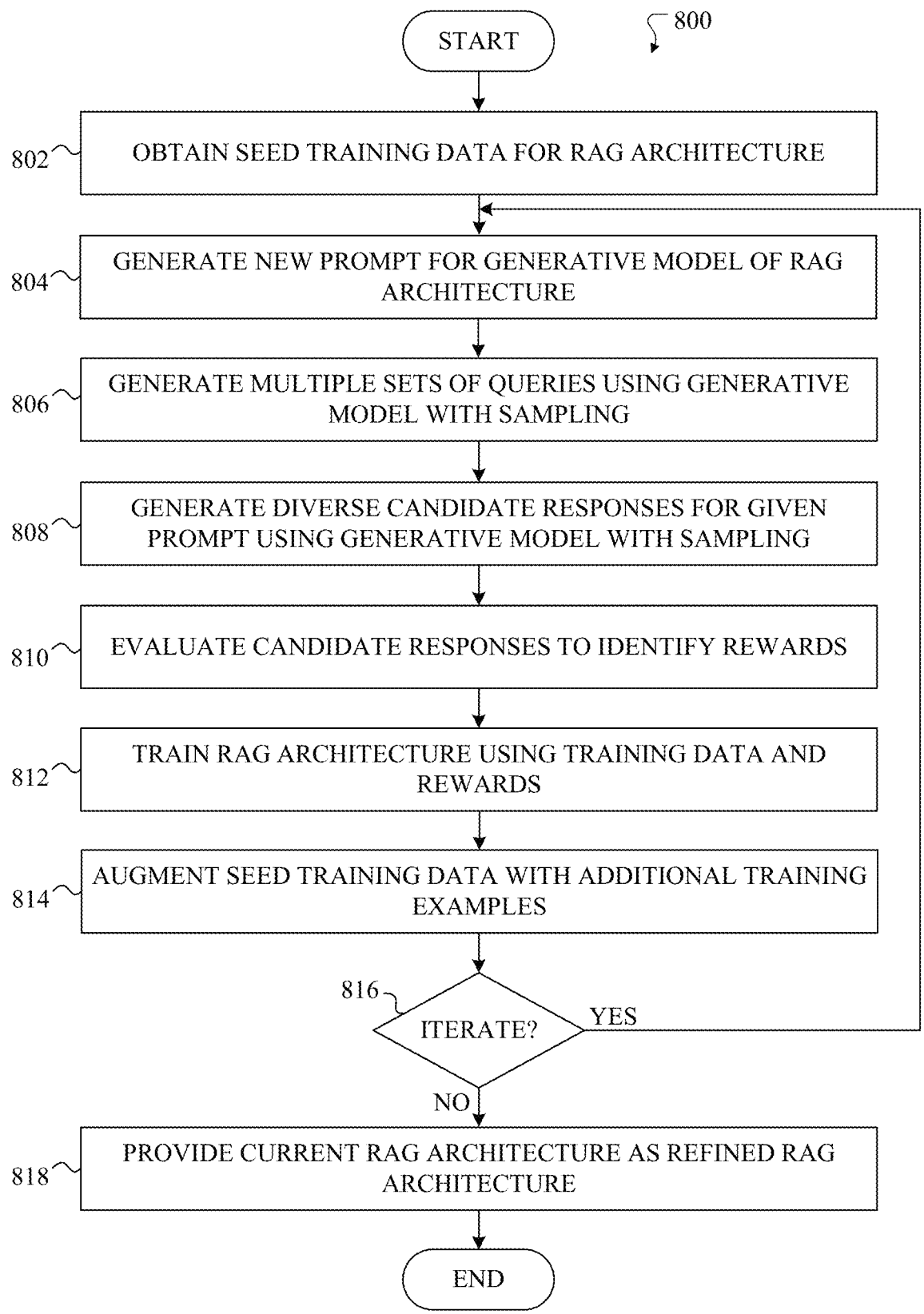
FIG. 8 illustrates an example method for RAG system optimization according to this disclosure.

FIG. 8 illustrates an example method 800 for RAG system optimization according to this disclosure. For ease of explanation, the method 800 shown in FIG. 8 is described as being performed by the application server 106 in the system 100 shown in FIG. 1, where the application server 106 may be implemented using one or more instances of the device 200 shown in FIG. 2 and may use the architecture 700 shown in FIG. 7. However, the method 800 shown in FIG. 8 could be performed using any other suitable device(s) and architecture(s) and in any other suitable system(s). Also, for case of explanation, the method 800 shown in FIG. 8 is described as being used to optimize the RAG-based architecture 300 shown in FIG. 3. However, the method 800 shown in FIG. 8 could be used to optimize any other suitable RAG-based architecture.

As shown in FIG. 8, seed training data for a RAG architecture is obtained at step 802. This may include, for example, the processing device 202 of the application server 106 performing the initialization function 706 to obtain IFT and EFT data. The IFT and EFT data or other seed training data may be obtained from any suitable source(s), such as when at least some of the seed training data is obtained from at least one human author. The seed training data here can represent training data to be used with a base RAG architecture 702.

A new prompt for a generative model of the RAG architecture is generated at step 804. This may include, for example, the processing device 202 of the application server 106 performing the self-instruction creation function 708 to generate a new prompt xi based on the original IFT data. In some cases, the new prompt xi may be generated using few-shot prompting. Multiple sets of queries are generated using the generative model with sampling at step 806. This may include, for example, the processing device 202 of the application server 106 performing the self-instruction creation function 708 to ask the generative model 316 for multiple queries that are similar to a specified query. This can be done multiple times with sampling to produce the multiple sets of queries. The multiple sets of queries can be used to request that the retriever model 314 obtain a set of the top K document chunks 404 for each query in the sets and aggregating the identified document chunks 308 (such as via reciprocal rank fusion).

Multiple diverse candidate responses for the given prompt are generated using the generative model with sampling at step 808. This may include, for example, the processing device 202 of the application server 106 performing the self-instruction creation function 708 to provide the prompt xi to the generative model 316 and to identify the diverse candidate responses from the generative model 316 by sampling during the decoding phase of the generative model 316. The candidate responses are evaluated to identify rewards associated with the RAG architecture at step 810. This may include, for example, the processing device 202 of the application server 106 performing the self-instruction creation function 708 to generate reward values, such as values between zero and five (although other ranges of reward values may be used).

The RAG architecture is trained using the training data and the rewards at step 812, and the seed training data is augmented with additional training examples based on the training at step 814. This may include, for example, the processing device 202 of the application server 106 performing the instruction following training function 710 to train the RAG architecture based on the current training data and the determined rewards. During the first iteration of the instruction following training function 710, the base RAG architecture 702 can be trained using the original seed training data, such as via SFT, to update the RAG architecture. During subsequent iterations of the instruction following training function 710, the current RAG architecture can be trained using the augmented seed training data, such as via DPO, to update the RAG architecture. The training data may be augmented in any suitable manner, such as by augmenting the IFT and EFT data with various preference pairs (including the different types of preference pairs described above).

A determination is made whether to iterate the training process at step 816. This may include, for example, the processing device 202 of the application server 106 determining whether a specified number of iterations have occurred or whether some other criterion or criteria have been satisfied. If so, the process can return to an earlier step (such as step 804) to perform another iteration with the now-augmented training data. Otherwise, the current RAG architecture can be provided as a refined RAG architecture at step 818. This may include, for example, the processing device 202 of the application server 106 providing the current RAG architecture as the refined RAG architecture 704 in which both the retriever model 314 and the generative model 316 have been optimized.

Although FIG. 8 illustrates one example of a method 800 for RAG system optimization, various changes may be made to FIG. 8. For example, while shown as a series of steps, various steps in FIG. 8 may overlap, occur in parallel, occur in a different order, or occur any number of times (including zero times).

It should be noted here that a retriever having a reconfigurable sequence of rankers and RAG system optimization may be usable together. For example, RAG system optimization may be used to optimize the RAG-based system in the architecture 300, and the architecture 300 may then be used as described above to process document chunks 308 using a reconfigurable sequence of rankers 402. However, a retriever having a reconfigurable sequence of rankers and RAG system optimization are also usable separately. That is, a retriever having a reconfigurable sequence of rankers may be used without RAG system optimization, or RAG system optimization may be used with a RAG system that lacks a retriever having a reconfigurable sequence of rankers.

It should also be noted that the functions shown in or described with respect to FIGS. 2 through 8 can be implemented in an application server 106, user device 102a-102d, or other device(s) in any suitable manner. For example, in some embodiments, at least some of the functions shown in or described with respect to FIGS. 2 through 8 can be implemented or supported using one or more software applications or other software instructions that are executed by at least one processing device 202 of the application server 106, user device 102a-102d, or other device(s). In other embodiments, at least some of the functions shown in or described with respect to FIGS. 2 through 8 can be implemented or supported using dedicated hardware components. In general, the functions shown in or described with respect to FIGS. 2 through 8 can be performed using any suitable hardware or any suitable combination of hardware and software/firmware instructions. Also, the functions shown in or described with respect to FIGS. 2 through 8 can be performed by a single device or by multiple devices.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining an input query at a retriever model, the retriever model comprising a reconfigurable sequence of one or more rankers selected from among a plurality of rankers, each ranker configured to identify a specified number of information chunks relevant to the input query;
   providing one or more of the information chunks from the retriever model to a generative model;
   using the generative model to create a response to the input query, the response based on the one or more information chunks; and
   tuning the retriever model by determining the specified number of information chunks to be identified by each ranker in the reconfigurable sequence;
   wherein the plurality of rankers comprises a bi-encoder, a cross-encoder, and a large language model (LLM)-ranker; and
   wherein the specified number of information chunks to be identified by each ranker in the reconfigurable sequence is determined using a grid search.

2. The method of claim 1, wherein the retriever model is configured to process different fields of information in the information chunks differently.

3. The method of claim 1, wherein the retriever model is configured to dynamically select a size of the one or more information chunks provided to the generative model.

4. The method of claim 1, further comprising:
providing the response to a user device associated with a user.

5. The method of claim 1, wherein the generative model comprises a large language model.

6. The method of claim 1, wherein the grid search used to determine the specified number of information chunks to be identified by each ranker in the reconfigurable sequence comprises:
selecting values for the specified number of information chunks to be identified by each ranker in the reconfigurable sequence using a pre-defined grid;
using the retriever model and the generative model to process a validation set that includes annotated document chunks based on the selected values;
evaluating an accuracy of a system that includes the retriever model and the generative model based on the processing of the validation set; and
simultaneously tuning the values for the specified number of information chunks to be identified by each ranker in the reconfigurable sequence based on results of the evaluating.

7. The method of claim 6, wherein outputs generated by the retriever model and the generative model based on the validation set are compared to annotations of the annotated document chunks, the annotations treated as ground truths.

8. An apparatus comprising:
at least one processing device configured to:
provide an input query to a retriever model, the retriever model comprising a reconfigurable sequence of one or more rankers selected from among a plurality of rankers, each ranker configured to identify a specified number of information chunks relevant to the input query;
provide one or more of the information chunks from the retriever model to a generative model;
use the generative model to create a response to the input query, the response based on the one or more information chunks; and
determine the specified number of information chunks to be identified by each ranker in the reconfigurable sequence in order to tune the retriever model;
wherein the plurality of rankers comprises a bi-encoder, a cross-encoder, and a large language model (LLM)-ranker; and
wherein the at least one processing device is configured to determine the specified number of information chunks to be identified by each ranker in the reconfigurable sequence using a grid search.

9. The apparatus of claim 8, wherein the retriever model is configured to process different fields of information in the information chunks differently.

10. The apparatus of claim 8, wherein the retriever model is configured to dynamically select a size of the one or more information chunks provided to the generative model.

11. The apparatus of claim 8, wherein the at least one processing device is further configured to provide the response to a user device associated with a user.

12. The apparatus of claim 8, wherein the generative model comprises a large language model.

13. The apparatus of claim 8, wherein, to determine the specified number of information chunks to be identified by each ranker in the reconfigurable sequence using the grid search, the at least one processing device configured to:
select values for the specified number of information chunks to be identified by each ranker in the reconfigurable sequence using a pre-defined grid;
use the retriever model and the generative model to process a validation set that includes annotated document chunks based on the selected values;
evaluate an accuracy of a system that includes the retriever model and the generative model based on the processing of the validation set; and
simultaneously tune the values for the specified number of information chunks to be identified by each ranker in the reconfigurable sequence based on results of the evaluating.

14. The apparatus of claim 13, wherein the at least one processing device is configured to compare outputs generated by the retriever model and the generative model based on the validation set to annotations of the annotated document chunks, the annotations treated as ground truths.

15. A non-transitory computer readable medium containing instructions that when executed cause at least one processor to:
obtain an input query at a retriever model, the retriever model comprising a reconfigurable sequence of one or more rankers selected from among a plurality of rankers, each ranker configured to identify a specified number of information chunks relevant to the input query;
provide one or more of the information chunks from the retriever model to a generative model;
use the generative model to create a response to the input query, the response based on the one or more information chunks; and
determine the specified number of information chunks to be identified by each ranker in the reconfigurable sequence to tune the retriever model;
wherein the plurality of rankers comprises a bi-encoder, a cross-encoder, and a large language model (LLM)-ranker; and
wherein the instructions when executed cause the at least one processor to determine the specified number of information chunks to be identified by each ranker in the reconfigurable sequence using a grid search.

16. The non-transitory computer readable medium of claim 15, wherein the retriever model is configured to process different fields of information in the information chunks differently.

17. The non-transitory computer readable medium of claim 15, wherein the retriever model is configured to dynamically select a size of the one or more information chunks provided to the generative model.

18. The non-transitory computer readable medium of claim 15, further containing instructions that when executed cause the at least one processor to provide the response to a user device associated with a user.

19. The non-transitory computer readable medium of claim 15, wherein the instructions that when executed cause the at least one processor to determine the specified number of information chunks to be identified by each ranker in the reconfigurable sequence using the grid search comprise:
instructions that when executed cause the at least one processor to:

select values for the specified number of information chunks to be identified by each ranker in the reconfigurable sequence using a pre-defined grid;

use the retriever model and the generative model to process a validation set that includes annotated document chunks based on the selected values;

evaluate an accuracy of a system that includes the retriever model and the generative model based on the processing of the validation set; and simultaneously tune the values for the specified number of information chunks to be identified by each ranker in the reconfigurable sequence based on results of the evaluating.

20. The non-transitory computer readable medium of claim 19, wherein the instructions when executed cause the at least one processor to compare outputs generated by the retriever model and the generative model based on the validation set to annotations of the annotated document chunks, the annotations treated as ground truths.

* * * * *